US011198060B2

(12) United States Patent
Machida et al.

(10) Patent No.: US 11,198,060 B2
(45) Date of Patent: Dec. 14, 2021

(54) CONTROL APPARATUS AND CONTROL PROGRAM

(71) Applicant: Sony Interactive Entertainment Inc., Tokyo (JP)

(72) Inventors: Yuichi Machida, Kanagawa (JP); Kunihito Sawai, Kanagawa (JP); Shinichi Hirata, Kanagawa (JP); Yoshihisa Takahashi, Saitama (JP); Yoichi Nishimaki, Kanagawa (JP); Yasushi Okumura, Tokyo (JP); Norihiro Nagai, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/942,092

(22) Filed: Jul. 29, 2020

(65) Prior Publication Data
US 2020/0353352 A1    Nov. 12, 2020

Related U.S. Application Data

(63) Continuation of application No. 16/075,265, filed as application No. PCT/JP2017/004763 on Feb. 9, 2017, now Pat. No. 10,850,192.

(30) Foreign Application Priority Data

Mar. 4, 2016  (JP) .................. 2016-042403

(51) Int. Cl.
*A63F 13/285*    (2014.01)
*A63F 13/42*    (2014.01)
(Continued)

(52) U.S. Cl.
CPC ............ *A63F 13/285* (2014.09); *A63F 13/23* (2014.09); *A63F 13/235* (2014.09); *A63F 13/24* (2014.09);
(Continued)

(58) Field of Classification Search
None
See application file for complete search history.

(56) References Cited

U.S. PATENT DOCUMENTS 5,555,894 A    9/1996    Doyama
5,734,373 A    3/1998    Rosenberg
(Continued)

FOREIGN PATENT DOCUMENTS

CN    101610877 A    12/2009
CN    104043246 A    9/2014
(Continued)

OTHER PUBLICATIONS

Notice of Reasons for Refusal for related application JP Application No. 2019549971, 8 pages, dated Apr. 20, 2021.
(Continued)

*Primary Examiner* — Jason T Yen
(74) *Attorney, Agent, or Firm* — Matthew B. Dernier (57) ABSTRACT

Methods and apparatus provide for causing a device to present a sense of force against depressing of a button in response to receiving an input initiated by the user of a sense-of-force presentation start position in said predetermined movable range, and to store the sense-of-force presentation start position in a memory in response to the input initiated by the user; acquiring a depress amount of said button; receiving the sense-of-force presentation start position from the memory; and instructing the presentation of the sense of force against depressing of said button when said depress amount reaches said sense-of-force presentation start position.

3 Claims, 4 Drawing Sheets

(51) Int. Cl.
- *A63F 13/23* (2014.01)
- *A63F 13/24* (2014.01)
- *A63F 13/28* (2014.01)
- *G06F 3/01* (2006.01)
- *A63F 13/235* (2014.01)
- *G06F 3/0338* (2013.01)

(52) U.S. Cl.
CPC .............. *A63F 13/28* (2014.09); *A63F 13/42* (2014.09); *G06F 3/01* (2013.01); *G06F 3/016* (2013.01); *G06F 3/0338* (2013.01); *G06F 2203/013* (2013.01); *G06F 2203/015* (2013.01)

(56) References Cited

U.S. PATENT DOCUMENTS

| | | | |
|---|---|---|---|
| 5,982,354 | A | 11/1999 | Arita |
| 5,999,168 | A | 12/1999 | Rosenberg |
| 6,380,925 | B1 | 4/2002 | Martin |
| 6,468,158 | B1 * | 10/2002 | Ootori .................... G05G 9/047 463/38 |
| 7,196,688 | B2 | 3/2007 | Schena |
| 8,059,089 | B2 | 11/2011 | Daniel |
| 8,491,388 | B2 | 7/2013 | Miyazaki |
| 8,686,961 | B2 | 4/2014 | Yamano |
| 9,164,587 | B2 | 10/2015 | Da Costa |
| 9,174,134 | B1 | 11/2015 | Grant |
| 9,174,344 | B2 | 11/2015 | Nahavandi |
| 9,490,088 | B2 | 11/2016 | Sawada |
| 9,557,830 | B2 | 1/2017 | Grant |
| 9,606,569 | B2 | 3/2017 | Ueda |
| 9,778,743 | B2 | 10/2017 | Grant |
| 9,785,237 | B2 | 10/2017 | Shinozaki |
| 10,124,252 | B2 | 11/2018 | Grant |
| 10,133,354 | B2 | 11/2018 | Grant |
| 10,159,896 | B2 | 12/2018 | Strahle |
| 10,185,396 | B2 | 1/2019 | Rihn |
| 10,216,278 | B2 | 2/2019 | Nakamura |
| 10,226,693 | B2 | 3/2019 | Strahle |
| 10,300,778 | B2 | 5/2019 | Nomizo |
| 10,353,471 | B2 | 7/2019 | Da Costa |
| 10,509,472 | B2 | 12/2019 | Grant |
| 10,534,432 | B2 | 1/2020 | Okumura |
| 10,632,367 | B2 | 4/2020 | Strahle |
| 2001/0002126 | A1 | 5/2001 | Rosenberg |
| 2001/0008849 | A1 | 7/2001 | Komata |
| 2001/0030658 | A1 | 10/2001 | Rosenberg |
| 2002/0054060 | A1 | 5/2002 | Schena |
| 2002/0190528 | A1 | 12/2002 | Ootori |
| 2004/0113932 | A1 | 6/2004 | Rosenberg |
| 2005/0156892 | A1 | 7/2005 | Grant |
| 2006/0028095 | A1 | 2/2006 | Maruyama |
| 2009/0131171 | A1 | 5/2009 | Miyazaki |
| 2010/0092267 | A1 | 4/2010 | Najdovski |
| 2011/0134034 | A1 | 6/2011 | Daniel |
| 2012/0026110 | A1 | 2/2012 | Yamano |
| 2012/0038468 | A1 | 2/2012 | Provancher |
| 2012/0105367 | A1 * | 5/2012 | Son .................... G06F 3/04883 345/174 |
| 2012/0154134 | A1 | 6/2012 | Lim |
| 2013/0147610 | A1 * | 6/2013 | Grant .................... A63F 13/24 340/12.5 |
| 2013/0265149 | A1 | 10/2013 | Nakamura |
| 2013/0267321 | A1 | 10/2013 | Burgess |
| 2013/0321273 | A1 | 12/2013 | O'Keefe |
| 2014/0094310 | A1 | 4/2014 | Bleich |
| 2014/0139451 | A1 | 5/2014 | Levesque |
| 2014/0274398 | A1 | 9/2014 | Grant |
| 2014/0305783 | A1 | 10/2014 | Sawada |
| 2014/0315642 | A1 | 11/2014 | Grant |
| 2015/0002416 | A1 | 1/2015 | Koike |
| 2015/0035658 | A1 | 2/2015 | Provancher |
| 2015/0042461 | A1 | 2/2015 | Shinozaki |
| 2015/0098004 | A1 | 4/2015 | Ueda |
| 2015/0130707 | A1 | 5/2015 | Da Costa |
| 2015/0133221 | A1 | 5/2015 | Grant |
| 2016/0051986 | A1 | 2/2016 | Lin |
| 2016/0132114 | A1 | 5/2016 | Rihn |
| 2016/0259536 | A1 * | 9/2016 | Kudurshian .......... G06F 3/0488 |
| 2016/0313795 | A1 | 10/2016 | Muramatsu |
| 2016/0361639 | A1 | 12/2016 | Schmitz |
| 2017/0031442 | A1 | 2/2017 | Dabic |
| 2017/0203208 | A1 | 7/2017 | Sato |
| 2017/0351394 | A1 | 12/2017 | Sumida |
| 2018/0018020 | A1 | 1/2018 | Grant |
| 2018/0250587 | A1 | 9/2018 | Strahle |
| 2018/0284893 | A1 | 10/2018 | Shimizu |
| 2018/0333642 | A1 | 11/2018 | Strahle |
| 2019/0025916 | A1 | 1/2019 | Okumura |
| 2019/0038968 | A1 | 2/2019 | Machida |
| 2019/0118081 | A1 | 4/2019 | Strahle |
| 2019/0224565 | A1 | 7/2019 | Yamano |

FOREIGN PATENT DOCUMENTS

| | | |
|---|---|---|
| CN | 104107539 | 10/2014 |
| CN | 104798013 A | 7/2015 |
| EP | 0626634 A2 | 11/1994 |
| EP | 0852789 A1 | 7/1998 |
| EP | 1524578 A1 | 4/2005 |
| EP | 2778852 A2 | 9/2014 |
| EP | 2796965 A2 | 10/2014 |
| EP | 2873446 A1 | 5/2015 |
| JP | 7194846 A | 8/1995 |
| JP | 07220563 A | 8/1995 |
| JP | 11514469 A | 12/1999 |
| JP | 2000195370 A | 7/2000 |
| JP | 2003519861 A | 6/2003 |
| JP | 2003330585 A | 11/2003 |
| JP | 2005190465 A | 7/2005 |
| JP | 3686686 B2 | 8/2005 |
| JP | 2006157642 A | 6/2006 |
| JP | 2007330369 A | 12/2007 |
| JP | 2008173186 A | 7/2008 |
| JP | 2008257295 A | 10/2008 |
| JP | 2008257748 A | 10/2008 |
| JP | 2009119125 A | 6/2009 |
| JP | 2010020526 A | 1/2010 |
| JP | 2012027875 A | 2/2012 |
| JP | 2012118761 A | 6/2012 |
| JP | 2012128499 A | 7/2012 |
| JP | 2013045230 A | 3/2013 |
| JP | 2013117900 A | 6/2013 |
| JP | 2014174660 A | 9/2014 |
| JP | 2014180572 A | 9/2014 |
| JP | 2014216017 A | 11/2014 |
| JP | 2015011470 A | 1/2015 |
| JP | 2015075912 A | 4/2015 |
| JP | 2015111417 A | 6/2015 |
| JP | 2015111542 A | 6/2015 |
| JP | 2016001510 A | 1/2016 |
| JP | 2016067667 A | 5/2016 |
| JP | 2016095625 A | 5/2016 |
| JP | 2017508191 A | 3/2017 |
| KR | 20050048902 A | 5/2005 |
| KR | 1020150056070 A | 5/2015 |
| WO | 9712357 A1 | 4/1997 |
| WO | 2005116802 A1 | 12/2005 |
| WO | 2013099742 A1 | 7/2013 |
| WO | 2015092966 A1 | 6/2015 |
| WO | 2016051986 A1 | 4/2016 |
| WO | 2016105496 A1 | 6/2016 |
| WO | 2016114269 A1 | 7/2016 |
| WO | 2017150128 A1 | 9/2017 |
| WO | 2017150129 A1 | 9/2017 |

OTHER PUBLICATIONS

Notice of Reason for Refusal for corresponding JP Application No. 2019-214619, 6 pages, dated Sep. 2, 2020.

Notice of Reason for Refusal for corresponding JP Application No. 2019-184529, 10 pages, dated Sep. 2, 2020.

(56) References Cited

OTHER PUBLICATIONS

The First Office Action for related CN Application No. 201780044599.0, 20 pages, dated Jun. 4, 2021.
Notice of Reasons for Refusal for related application JP Application No. 2020104664, 10 pages, dated Mar. 29, 2021.
Notice of Reason for Refusal for corresponding JP Application No. 2019-221160, 6 pages, dated Sep. 18, 2020.
International Search Report for related PCT Application No. PCT/JP2017/004763, 2 pages, dated Apr. 18, 2017.
International Preliminary Report on Patentability and Written Opinion for related PCT Application No. PCT/JP2017/004763, 11 pages, dated Sep. 13, 2018.
International Search Report for related PCT Application No. PCT/JP2017/017909, 7 pages, dated Jul. 18, 2017.
International Search Report for related PCT Application No. PCT/2017/004978, 4 pages, dated Mar. 14, 2017.
International Search Report for related PCT Application No. PCT/JP2017/018914, 2 pages, dated Aug. 22, 2017.
International Preliminary Report on Patentability and Written Opinion for related PCT Application No. PCT/JP2017/017909, 17 pages, dated Feb. 7, 2019.
International Preliminary Report on Patentability and Written Opinion for related PCT Application No. PCT/JP2017/018914, 13 pages, dated Feb. 7, 2019.
International Preliminary Report on Patentability and Written Opinion for related PCT Application No. PCT/PCT/2017/004978, 13 pages, dated Jan. 31, 2019.
Notification of Reasons for Refusal for related JP Application No. 2018-528391, 9 pages, dated Apr. 23, 2019.
Extended European Search Report for related EP Application No. 17833789.5, 10 pages, dated May 23, 2019.
Supplementary Search Report for relatedng European Search Report for corresponding Application No. 17833805, 12 pages, dated Jul. 19, 2019.
Decision of Refusal for related Japanese Patent Application No. 2018-528391, 10 pages, dated Jul. 9, 2019.
Extended European Search Report for related European Application No. 17759599.8, 7 pages, dated Sep. 9, 2019.
Korean Office Action for related Application No. 1020197002594, 11 pages, dated Sep. 18, 2019.
Extended European Search Report for corresponding Application No. 17833805.9, 14 pages, dated Nov. 6, 2019.
Notification of Reasons for Refusal for corresponding Application No. JP2018-529371, 9 pages, dated Oct. 29, 2019.
International Search Report for corresponding PCT Application No. PCT/JP2017/035570, 8 pages, dated Dec. 26, 2017.
Office Action for corresponding Korean Application No. 10-2019-7002594, 10 pages, dated Mar. 26, 2020.
International Search report for related application PCT/JP2017/038937, 4 pages, dated Jan. 30, 2018.
International Preliminary Report on Patentability and Written Opinion for related PCT Application No. PCT/JP2017/035570, 20 pages, dated Apr. 9, 2020.
International Preliminary Report on Patentability and Written Opinion for related PCT Application No. PCT/JP2017/038937, 14 pages, dated May 7, 2020.
Extended European Search Report application EP Application No. 21159343.9, 11 pages, dated May 21, 2021.
First Office Action for corresponding CN Application No. 201780044603.3, 21 pages dated Jun. 29, 2021.

\* cited by examiner

CONTROL APPARATUS AND CONTROL PROGRAM

CROSS REFERENCE TO RELATED APPLICATIONS

This is a continuation application of U.S. patent application Ser. No.: 16/075,265, accorded a 371(c) date of Aug. 3, 2018; which is a national stage application of PCT/JP2017/004763, filed Feb. 9, 2017; which claims priority to JP2016-042403, filed Mar. 4, 2016, the entire disclosures of which are hereby incorporated by reference.

TECHNICAL FIELD

The present invention relates to a control apparatus and a control program.

BACKGROUND ART

A controller device for use in home game machines and so on detects operations of depressing a button by a user and shaking the controller device and the like and sends the information indicative of these detected user operations to the main body of the game machine or the like.

Some controller devices are known in which an acceleration sensor and so on are built so as to detect the timing and strength of the shaking of the controller device by a user and output the detected information. Also known is a controller device designed to be worn on the hand of a user like a glove, thereby detecting finger movements.

SUMMARY

Technical Problems

However, the related-art controller devices are not gripped in each of the hands of a user, making it difficult to present the sense of force for such a movement of each finger of the left and right hands of the user as a gripping operation. Further, although a controller device shaped like a glove can present the sense of force, wearing the glove causes the sense of unnaturalness, thereby possibly deteriorating the sense of immersion in game playing or the like.

Therefore, it is an object of the present invention to solve the above-mentioned problems by providing a control apparatus and a control program that are configured to control a controller device capable of presenting the sense of force for the movement of each finger of the left and right hands of a user while mitigating the sense of unnaturalness caused by wearing the

Solution to Problems

The present invention for solving problems of the above-mentioned relate-art technologies is a control apparatus for a device with one of left and right sides of the device fixed as pressed against a palm of a user. The device includes a button that is depressible within a predetermined movable range and a sense-of-force presentation block that presents a sense of force against depressing of the button within a range in which any of fingers of the user is reachable. The control apparatus includes means of receiving an input of a sense-of-force presentation start position in the predetermined movable range, means of acquiring a depress amount of the button, and means of instructing the sense-of-force presentation block to present a sense of force against depressing of the button when the depress amount reaches the inputted sense-of-force presentation start position.

Advantageous Effect of Invention

According to the present invention, the sense of force can be presented for the movement of each finger of the left and right hands of a user while mitigating the sense of unnaturalness caused by wearing of the controller device.

DESCRIPTION OF EMBODIMENT

The following describes an embodiment of the present invention with reference to drawings. It should be noted that, in the following description, the sizes of components, the ratios between these sizes, and the arrangement of these components are illustrative only; therefore, the examples of the present embodiment are not limited to the sizes, ratios, and arrangement illustrated and otherwise indicated in the drawings.

Figure 1:
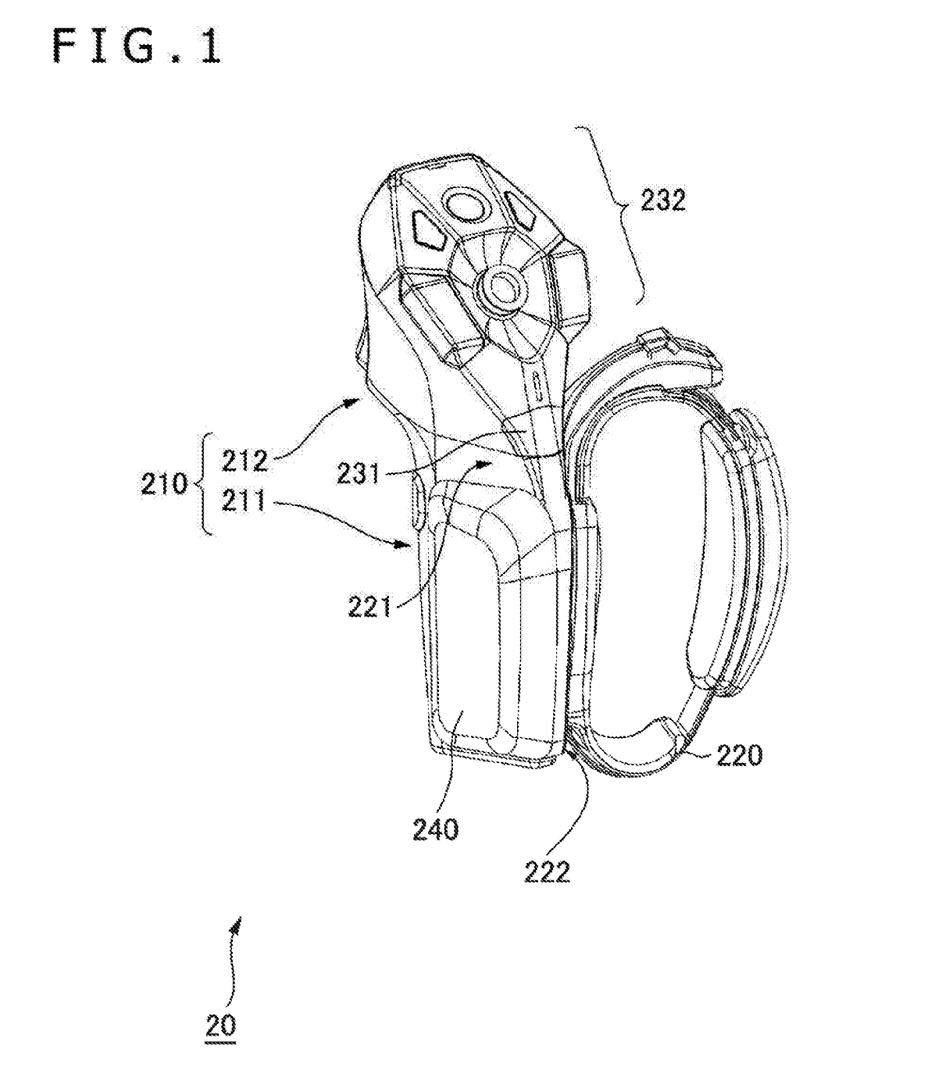
FIG. 1 is a perspective view illustrating, from a front side, a device controlled by a control apparatus practiced as one embodiment of the present invention.
Figure 2:
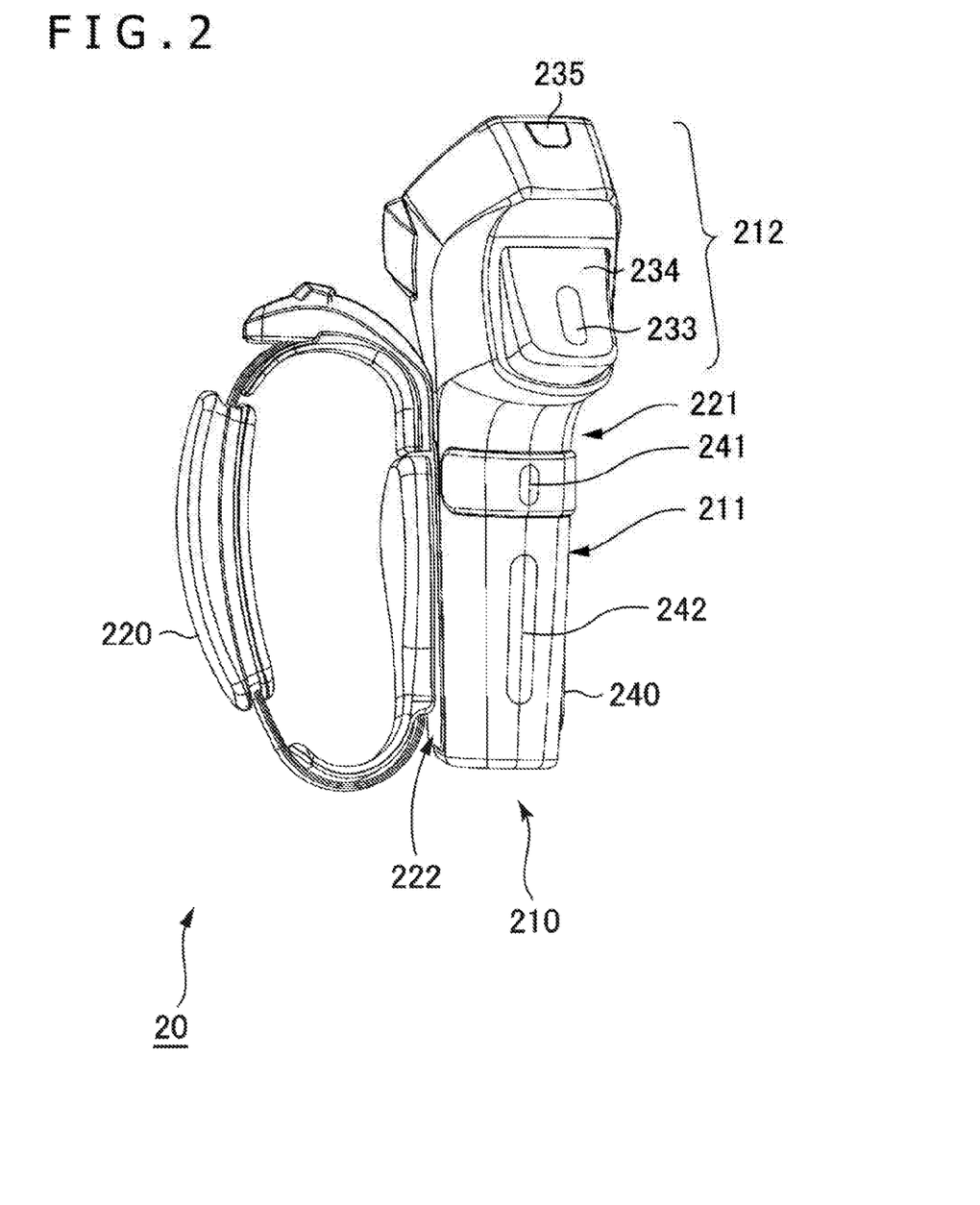
FIG. 2 is a perspective view illustrating, from a rear side, the device controlled by the control apparatus practiced as one embodiment of the present invention.

A device 20 to be controlled by a control apparatus 10 related with one example of the embodiment of the present invention is a controller device that is illustrated in FIG. 1 and FIG. 2, for example. FIG. 1 is a perspective view illustrating the device 20 seen from the front side and FIG. 2 is a perspective view illustrating the device 20 seen from the rear side. In one example of the present embodiment, the device 20 is configured by a device main body 210 and a fixture 220. The fixture 220 is one of accessories.

The device main body 210 includes a holding block 211 that is held by a user and a manipulation block 212. The holding block 211 has a left-side surface 221 and a right-side surface 222 and is substantially formed into a polygonal column in one example of the present embodiment. The manipulation block 212 is formed continuously from the holding block 211 and, in the examples illustrated in FIGS. 1 and 2, includes a thumb sensor block 231 and a button manipulation block 232 on the front side and a first finger sensor 233, a depress button 234, and a display block 235 on the rear side. In addition, on the rear side of the holding block 211, a second finger sensor 241 and a third finger sensor 242 are arranged.

On one of the left-side surface 221 and the right-side surface 222 of the device main body 210, the fixture 220 that is an accessory is fixed. Further, on the other side of the left-side surface 221 or the right-side surface 222, a battery 240, another accessory, may be fixed. In the example of the present embodiment, the fixture 220 may be made by forming a flexible belt into a ring. Also, the fixture 220 may be made by forming stop means such as a buckle into a ring, the diameter of which is adjustable.

The device 20 is used as fixed at a position where the device main body 210 abuts against the base of the thumb of the user with the other fingers of the user, the index finger to the little finger, being passing through the fixture 220 such as a ring-formed belt. In the examples of FIGS. 1 and 2, at this moment, the device 20 is fixed with the right-side surface 222 of the device 20 pressed against the palm of the user. Further, the device 20 is approximately as large as that, when the user naturally hold the device main body 210, the distal end of the thumb of the user reaches the button manipulation block 232 on the front side of the device 20 and the proximal side of the thumb of the user comes close to the thumb sensor block 231. Still further, the index finger as one example of any one of the fingers of the user shall be positioned so as to touch the depress button 234 on the rear side of the device 20, thereby making the user grip the holding block 211 with the palm, the middle finger, the ring finger, and the little finger. Obviously, if the user opens his or her hand from this state, the device 20 is fixed to the hand of the user with the fixture 220, so that the user is able to close or open his or her fingers without feeling the resistance to the fingers.

When the user naturally holds the device main body 210, the thumb sensor block 231 is arranged at a position that the proximal side of the thumb of the user comes close, this position being somewhat below a position reached by the distal side of the thumb of the user, for example. The thumb sensor block 231 detects the thumb of the user within a detectable range that is a comparatively wide angle range of the left-side surface side of the front of the device 20 to the right-side surface side around the normal-line direction of the surface of the device 20 that is the front side of the device 20. Then, the position (the angle within the above-mentioned angle range) at which the thumb concerned is detected and a distance from the thumb sensor block 231 to the detected thumb of the user are detected so as to be output to the control apparatus 10 as detection result information. This detection result information includes the information related to the position at which the thumb was detected and the information related to the distance up to the thumb. The thumb sensor block 231 may be any device that is capable of detecting the position of the thumb and the distance up to the thumb, such as a camera, a pyroelectric sensor, a capacitance sensor or the like, for example. The button manipulation block 232 includes at least one button and, when depressed by the user, outputs the information for identifying the depressed button to the control apparatus 10.

The depress button 234 is a button having a button knob that is movable between a first position projecting to the rear side of the device 20 and a second position depressed into the side of the device 20. In FIGS. 1 and 2, an example in which the depress button 234 is a rocking switch (a rocking button) is illustrated. The depress button 234 is depressingly operated with any one of the fingers, such as the index finger, of the user, thereby outputting the information indicative of the depress amount (the travel amount of the button knob) of this operation to the control apparatus 10. To be more specific, the depress button 234 can be made up of a potentiometer or the like; however, as long as the depress amount can be detected, any other configurations are usable.

The display block 235 has a light emitting diode (LED) that can emit light in multiple colors, for example. In accordance with a command entered from the control apparatus 10, the display block 235 makes the LED emit light in an indicated light emitting mode (a mode in which the LED is turned in an indicator color or blinked with indicated intervals, for example).

Further, in the present embodiment, the first finger sensor 233 is amounted on the depress button 234. The first finger sensor 233 detects whether or not the depress button 234 is touched by the index finger and outputs the information indicative of the result of this detection to the control apparatus 10. The first finger sensor 233 can be made up of a capacitance sensor or the like, for example.

Still further, in one example of the present embodiment, the depress button 234 may have a sense-of-force presentation apparatus. In accordance with a command (a magnitude of force to be presented F) entered from the control apparatus 10, the depress button 234 having the sense-of-force presentation apparatus presents a force against a force with which the user depresses the depress button 234. To be more specific, the depress button 234 having this sense-of-force presentation apparatus can be made up of a motor having a rotor that rotates when the user executes an operation of depressing the depress button 234, a direct-acting actuator in which a driven body linearly travels when the depress button 234 is depressed, and so on. When such a motor and so on are used, if the rotation by depressing or the travel of a driven body takes place, the sense-of-force presentation apparatus of the depress button 234 controls the motor or the actuator so as to apply force F in the direction reverse to this rotation or the travel. Thus, for the sense-of-force presentation apparatus arranged on a depress button so as to present a sense-of-force upon reception of a command for identifying magnitude of force to be presented F, any widely known products can be employed, so that the description of further details is skipped here.

Yet further, in the present embodiment, the device 20 may vibrate the device main body 210 with a vibrator, a haptic device, a speaker, or the like to as to transmit the vibration to the palm of the user on the device 20 is fixed, thereby presenting the sense of touch. The detail description of a method of the presentation of the sense of touch is also skipped here.

The second finger sensor 241 detects whether or not the holding block 211 of the device 20 is in the proximity of (or touched by) the middle finger of the user. Then, the information indicative of the result of this detection is output to the control apparatus 10. Likewise, the third finger sensor 242 detects whether or not the holding block 211 of the device 20 is in the proximity of (or touched by) the ring finger or the little finger of the user. Then, the information indicative of the result of this detection is output to the control apparatus 10. These second finger sensor 241 and third finger sensor 242 can each be made up of a capacitance sensor, an optical sensor, or the like. Here, optical sensors include those each having a light-emitting block for radiating infrared light and a photoreception block for detecting infrared light, thereby measuring a ratio with which the light radiated from the light-emitting block is reflected from an object into the photoreception block, for example. According to such an optical sensor, as an object gets closer in the proximity of the optical sensor, ratio (specific ratio) r obtained by dividing the intensity of the incident light into the photoreception block by the intensity of the light radiated from the light-emitting block gets greater, so that the approach of fingers or the like can be detected.

In addition, in the present embodiment, the device 20 may have a sensor (a fixture sensor) for detecting to which of the left-side surface 221 and the right-side surface 222 the fixture 220 that is a predetermined accessory is fixed. This fixture sensor, to be more specific, can be realized by arranging, on the left-side surface 221 and the right-side surface 222 individually, a micro switch or the like that is turned on upon amounting of the fixture 220. For a configuration in which, when a predetermined accessory such as above is mounted, the mounted side is detected, widely known method can be used, so that the detail description thereof is skipped. In the present embodiment, the result of the detection by this fixture sensor is inputted in the control apparatus 10.

Figure 3:
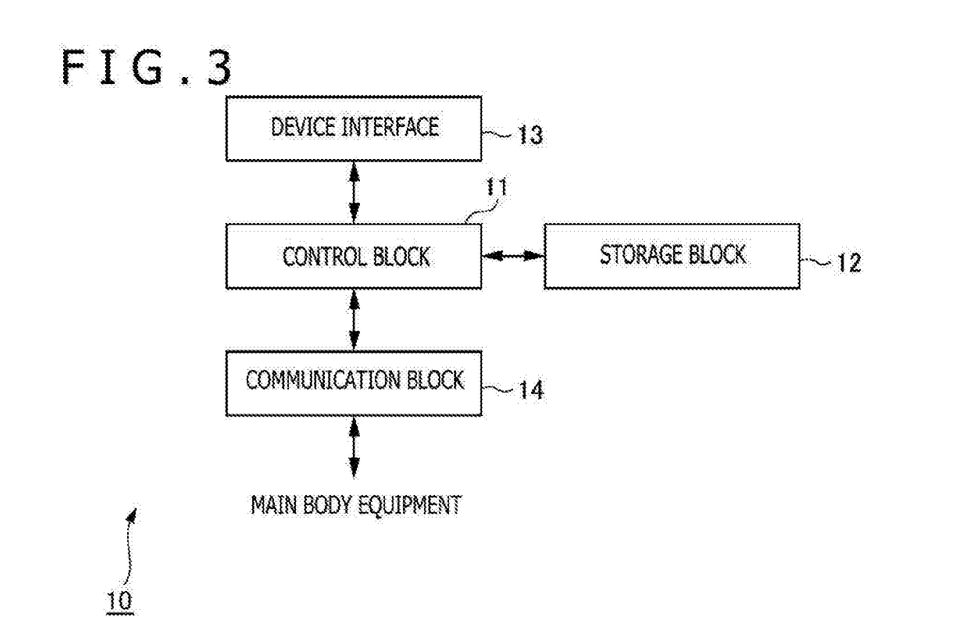
FIG. 3 is a block diagram illustrating an example of a configuration of the control apparatus practiced as one embodiment of the present invention.

The control apparatus 10 is built in the device main body 210 of the device 20, for example. As illustrated in FIG. 3, the control apparatus 10 is configured by a control block 11, a storage block 12, a device interface 13, and a communication block 14. The control block 11 is a program control device such as a central processing unit (CPU) or the like, operating as instructed by a program stored in the storage block 12. In the present embodiment, the control block 11 detects on which side, the right side or the left side of the device 20, the accessory of a predetermined type is mounted and, on the basis of the result of this detection, determines whether the device 20 is worn on the left hand or the right hand of the user. The specific contents of the control block 11 will be described later in detail.

The storage block 12 is a memory device or the like that holds a program to be executed by the control block 11. This program may be computer-readable, provided as stored in a non-temporary storage medium, and copied to the storage block 12. Further, the storage block 12 operates also as a work memory for the control block 11.

The device interface 13 is connected to the thumb sensor block 231 of the device 20, the button manipulation block 232, the first finger sensor 233, the depress button 234, the second finger sensor 241, the third finger sensor 242, and an sense-of-force presentation apparatus and outputs the information output from the thumb sensor block 231, the button manipulation block 232, the first finger sensor 233, the depress button 234, the second finger sensor 241, and the third finger sensor 242 to the control block 11. In addition, the device interface 13 outputs a command inputted from the control block 11 to the sense-of-force presentation apparatus.

The communication block 14 is configured by a serial interface such as a universal serial bus (USB) or the like or a wireless communication interface such as Bluetooth (registered trademark) or the like. The communication block 14 is communicably connected to a device (hereafter referred to as a main body equipment) that operates on the basis of the movement or the like of user's hand or fingers detected by the device 20, receives a command from this main body equipment, and outputs the received command to the control block 11. Further, the information output from the control block 11 is sent to the main body equipment.

Figure 4:
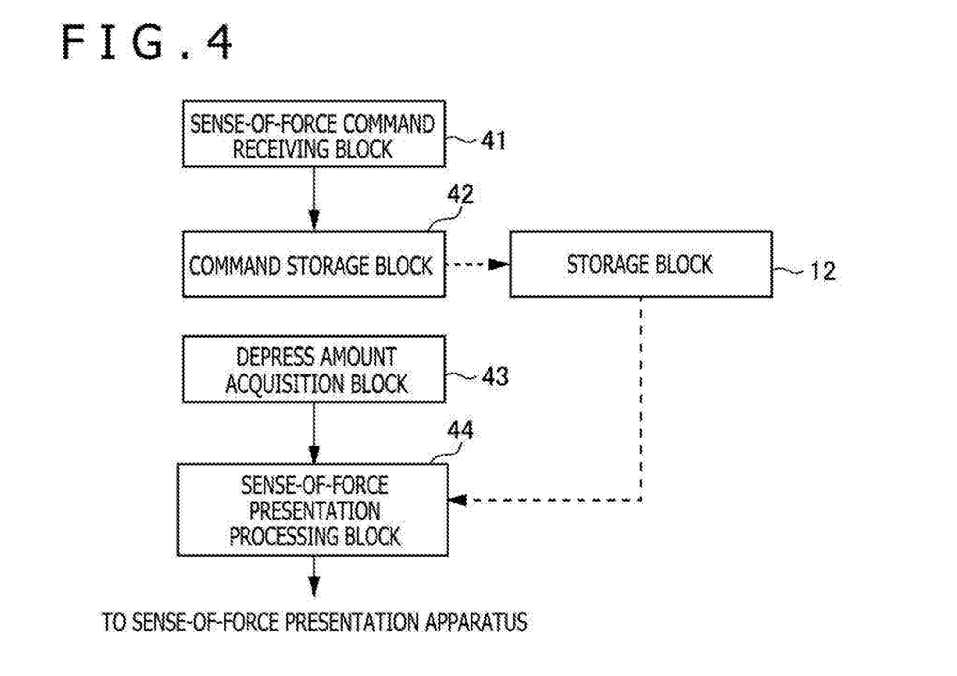
FIG. 4 is a block diagram illustrating another example of the control apparatus practiced as one embodiment of the present invention.

The following describes an operation of the control block 11 of the control apparatus 10. In the present embodiment, the control block 11 is functionally configured by a sense-of-force command receiving block 41, a command storage block 42, a depress amount acquisition block 43, and a sense-of-force presentation processing block 44 as illustrated in FIG. 4.

The sense-of-force command receiving block 41 receives the input of the setting related with the sense of force from the main body equipment. This setting is executed by indicating a sense-of-force presentation amount in accordance with a depress amount of the depress button 234. To be more specific, from the main body equipment, depress amount (sense-of-force presentation start position) Ds for starting sense-of-force presentation is specified. The sense-of-force command receiving block 41 outputs the information of the sense-of-force presentation amount received here to the command storage block 42. The command storage block 42 stores into the storage block 12 the sense-of-force presentation start position Ds that is the information of the sense-of-force presentation amount received by the sense-of-force command receiving block 41.

The depress amount acquisition block 43 repetitively acquires information D of the depress amount of the depress button 234 from the depress button 234 every predetermined timing (1/1000 second, for example).

The sense-of-force presentation processing block 44 determines whether or not the information D of the depress amount acquired by the depress amount acquisition block 43 is in excess of the sense-of-force presentation start position Ds stored in the storage block 12 (whether or not $D \geq Ds$). If the information D of the depress amount acquired by the depress amount acquisition block 43 is found to be in excess of the sense-of-force presentation start position Ds stored in the storage block 12 (if $D \geq Ds$), then the sense-of-force presentation processing block 44 controls the sense-of-force presentation apparatus of the depress button 234 so as to present the sense of force against the depressing of the depress button 234 by the user. It should be noted that the magnitude of the sense of force to be presented is a force that is enough for pushing back by $-\Delta D$ when the depress amount is $D+\Delta D$.

The control apparatus 10 according to the present embodiment has the configuration as described above and operates as follows. The user determines on which of the left and right hands the device 20 is to be worn. If the device 20 is to be worn on the right hand, then the user mounts the fixture 220 onto the right-side surface 222 of the device 20. If the device 20 is to be worn on the left hand, then the user mounts the fixture 220 onto the left-side surface 221 of the device 20. Also, at this moment, a battery 240 may be mounted on the side opposite to the side on which the fixture 220 is mounted. In this case, it is assumed that a terminal for carrying the power supply from the battery 240 to the internal circuit be arranged on the left-side surface 221 and the right-side surface 222 of the device 20 individually.

Next, the user pass the index finger, the middle finger, the ring finger, and the little finger of the left hand or the right hand through the fixture 220 mounted on the device 20 and wears the device 20 by abutting the device 20 to the base of the thumb. Then, the user holds the holding block 211 with the middle finger, the ring finger, and the little finger.

The control apparatus 10 receives the input of depress amount (sense-of-force presentation start position) Ds for starting sense-of-force presentation as the setting related with the sense of force from the side of the main body equipment. The control apparatus 10 stores the received depress amount (sense-of-force presentation start position) Ds for staring sense-of-force presentation into the storage block 12.

Further, when the user depresses the depress button 234 with the index finger, the control apparatus 10 acquires repetitively acquires information D of this depress amount every 1/1000 second.

The control apparatus 10 determines whether or not the sense-of-force presentation start position Ds stored in the storage block 12 is exceeded (whether or not $D \geq Ds$). While the information D of the depress amount acquired by the control apparatus 10 does not exceed the sense-of-force presentation start position Ds stored in the storage block 12 (while D<Ds), the control apparatus 10 does not control the sense-of-force presentation apparatus. Therefore, the control apparatus 10 controls the sense-of-force presentation apparatus of the depress button 234 such that the sense of force against the depressing of the depress button 234 is not presented. Hence, the user is able to further depress the depress button 234 without resistance.

If, in the course of time, the information D of the depress amount acquired by the control apparatus 10 exceeds the sense-of-force presentation start position Ds stored in the storage block 12 (if D≥Ds), then the control apparatus 10 controls the sense-of-force presentation apparatus of the depress button 234 to present the sense-of-force against the depressing of the depress button 234. This makes the user recognize as if the depressing beyond the sense-of-force presentation start position Ds is disabled.

Consequently, on the side of game software, for example, sense-of-force presentation start position Ds may be set in accordance with the size of a virtual object in a game, thereby making the user recognize the depressible amount (the depress amount of the depress button 234) according to the size of the virtual object.

According to one example of the present embodiment, also while the user is closing or opening fingers without feeling the resistance to the fingers, the finger movement and the depress amount of the depress button 234 can be detected and, at the same time, executing the sense-of-force presentation on the depress operation of the depress button 234 with any one of the fingers (the index finger in the example of the present embodiment) allows the user to feel the size and texture of a virtual object gripped in the user hand.

Other examples of sense-of-force to be presented

It should be noted that the setting related with the sense-of-force executed from the side of the main body equipment described so far is assumed to be the depress amount (sense-of-force presentation start position) Ds for starting sense-of-force presentation. That is, in the example described above, a force against the depress amount in excess of the depress amount Ds is presented so as to present a sense-of-force that may disable the depressing beyond this sense-of-force presentation start position. However, the embodiment of the present invention is not limited to this configuration.

For example, for the setting related with sense-of-force, the control apparatus 10 may receive the setting of the magnitude of force F against the depressing of the depress button 234 relative to the depress amount D of the depress button 234 within a predetermined movable range. In this example, in accordance with the depress amount, the sense-of-force presentation amount (force F necessary for depressing by $\Delta D$) is set from the side of the main body equipment. The setting in this case may only indicate the sense-of-force presentation start position Ds and the variable $\Delta F$ of the magnitude of the maximum sense of force presented per subsequent predetermined unit depress amount $\Delta D$. In this example, if the depress amount is $D=Ds+k\Delta D$ (k>0), the force F necessary for further depressing by $\Delta D$ becomes $F=k\Delta F$ (FIG. 5).

Here, the counter force $\Delta F$ that increases for every unit depress amount varies in a linear manner; however, this force may be set as varying in a logarithmic manner or an exponential manner. In addition, the maximum force Fmax to be presented may be set. If the maximum force Fmax is set and the force $F=k\Delta F$ and so on to be computed exceeds Fmax, then the control apparatus 10 instructs the sense-of-force presentation apparatus of the depress button 234 to present the force Fmax with the force F to be presented being Fmax.

Figure 5:
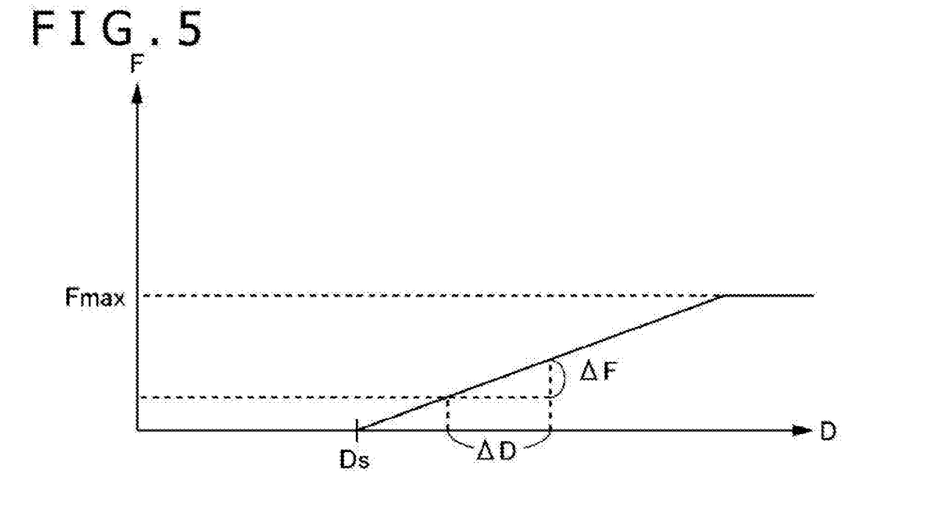
FIG. 5 is a diagram for describing a setting example of the presentation of the sense of force that is executed for the control apparatus practiced as one embodiment of the present invention.
Figure 6:
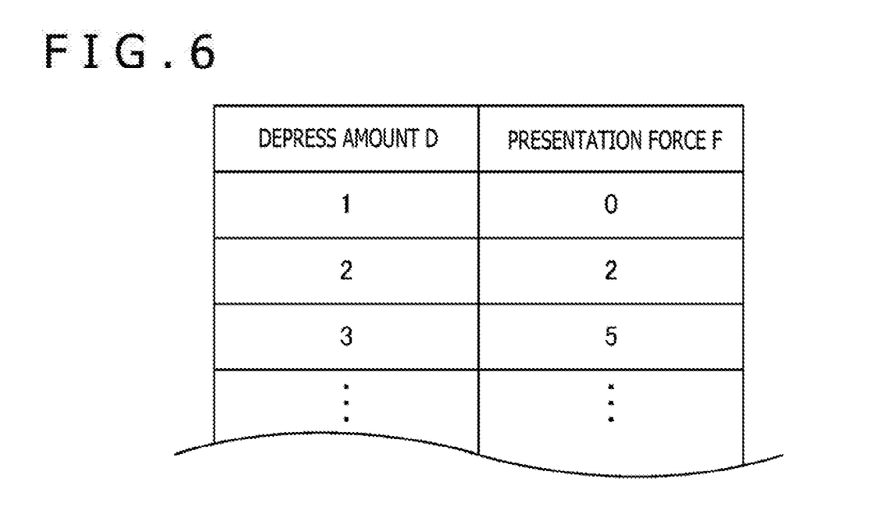
FIG. 6 is a diagram for describing an example of a sense-of-force amount table that is held in the control apparatus practiced as one embodiment of the present invention.

In this example, force F necessary for the user to depress the depress button 234 further from the depress amount D, relative to the depress amount D of the depress button 234, by $\Delta D$ is set as illustrated in FIG. 5. Then, as illustrated in FIG. 6, a sense-of-force value table in accordance with the variation (the variation in force F relative to depress amount D) illustrated in FIG. 5 is generated by the control apparatus 10 and the generated table is stored in the storage block 12.

Subsequently, when the user depresses the depress button 234 with the index finger, the control apparatus 10 repetitively acquires information D of the depress amount every $\frac{1}{1000}$ second, for example.

The control apparatus 10 references the sense-of-force value table stored in the storage block 12 so as to acquire force value F to be presented corresponding to the information D of the acquired depress amount. Then, the control apparatus 10 controls the sense-of-force presentation apparatus of the depress button 234 to present the sense-of-force of the force F against the depressing of the depress button 234.

In this example, the counter force at force F is presented when the user depresses the depress button 234 by D with force F, thereby putting the user into a state where the user cannot further depress the button once. When the user depresses the button with a force greater than the force F, the depressing by $\Delta D$ is enabled (at this moment, unless force F' stored in the sense-of-force value table in accordance with the information $D+\Delta D$ is further exceeded, counter force F' disabling further depressing is presented). This allows the user to feel as if the user is gripping an object having a restorative force.

It should be noted that, on the side of the main body equipment of the home game machines and so on, the settings of sense-of-force presentation start position Ds described so far, variation amount $\Delta F$ in the magnitude of the maximum sense of force to be presented per predetermined unit depress amount $\Delta D$, and so on may be values obtained as a result of the physical computation (the computation taking physical laws into consideration) done on a virtual object, for example. To be more specific, a parameter related with the elastic modulus of an object may be used so as to compute the restorative force for a depress amount by Hooke's law, thereby obtaining variation amount $\Delta F$ in the magnitude of the maximum sense of force to be presented per predetermined unit depress amount $\Delta D$.

Example in which the depress button is retracted in advance

In the description so far, if sense-of-force presentation start position Ds is inputted, the control apparatus 10 may control the sense-of-force presentation apparatus of the depress button 234 so as to put the depress button 234 into a state where the depress button 234 is retracted up to the sense-of-force presentation start position Ds in advance.

In this example, unless the user does not move the index finger up to the sense-of-force presentation start position Ds in accordance with sense-of-force presentation start position Ds, the user cannot touch the depress button 234. Hence, varying sense-of-force presentation start position Ds allows the user to recognize as if the user is touching a virtual object having a different size.

Example in which a sense of force is presented to a finger other than the index finger In the description of the present embodiment so far, the depress button 234 is manipulated with the index finger; however, the present embodiment is not limited thereto. For example, when the user naturally holds the device main body 210, the depress button 234 may be arranged at a position where any one of the middle finger, the ring finger, and the little finger reaches.

The above-mentioned configuration allows the presentation of sense of force to the middle finger, the ring finger, or the little finger, instead of the index finger, relative to the finger movement.

Further, in the description so far, the examples in which there is only one depress button 234 (only one finger to which sense of force is presented) are described; however, the present embodiment is not limited thereto. For example, two or more depress buttons 234 may be arranged corresponding to two or more fingers of the user, the index finger and the middle finger, for example. In this case, the settings of the sense-of-force presentation start position Ds of a sense of force to be presented at each depress button 234, subsequent variation amount $\Delta F$ in the magnitude of the maximum sense of force to be presented per predetermined unit depress amount $\Delta D$, and so on may be different from each other or the same as each other.

Still further, in the examples described so far, the depress button 234 has a sense-of-force presentation apparatus and a sense of force is presented for a manipulation of depressing the depress button 234. However, the present embodiment is not limited to this configuration; for example, instead of or in addition to the arrangement of a sense-of-force presentation apparatus on the depress button 234, a button, a switch, or the like arranged at the button manipulation block 232 (a button or the like manipulated by the thumb) may have a sense-of-force presentation apparatus, thereby presenting (presenting a counter force against depressing or tilting) a sense of force to a button depressing manipulation or a switch tilting manipulation.

According to the above-mentioned example, a sense of force can be presented to the thumb and, if a sense-of-force presentation apparatus is arranged on the depress button 234, a sense of force can be presented to the thumb and other fingers.

REFERENCE SIGNS LIST

10 Control apparatus, 11 Control block, 12 Storage block, 13 Device interface, 14 Communication block, 20 Device, 41 Sense-of-force command receiving block, 42 Command storage block, 43 Depress amount acquisition block, 44 Sense-of-force presentation processing block, 210 Device main body, 211 Holding block, 212 Manipulation block, 220 Fixture, 221 Left-side surface, 222 Right-side surface, 231 Thumb sensor block, 232 Button manipulation block, 233 First finger sensor, 234 Depress button, 235 Display block, 240 Battery, 241 Second finger sensor, 242 Third finger sensor

The invention claimed is:

1. An apparatus, comprising:
a housing having at least one holding portion for gripping by a user, including a side to be pressed against a palm of the user;
a button that is depressible by at least one finger of the user within a predetermined movable range of the button;
a sense-of-force presentation block that presents a sense of force against depressing of said button within a range;
a receiving unit operating to receive an input initiated by the user of a sense-of-force presentation start position in said predetermined movable range, and to store the sense-of-force presentation start position in a memory in response to the input initiated by the user;
an acquiring unit operating to acquire a depress amount of said button; and
an instructing unit operating to receive the sense-of-force presentation start position from the memory, and to instruct said sense-of-force presentation block to present a sense of force against depressing of said button when said depress amount reaches said sense-of-force presentation start position.

2. The control apparatus according to claim 1, wherein:
the receiving unit receives a setting of a magnitude of a force against depressing of the button relative to a depress amount of said button within said predetermined movable range; and
the instructing unit instructs said sense-of-force presentation block to present a sense of force against depression of said button with said preset magnitude of force corresponding to said acquired button depress amount.

3. A non-transitory, computer readable storage medium containing a control program, the control program operating control a computer connected to a device, the device having:
(i) a housing having at least one holding portion for gripping by a user, including a side to be pressed against a palm of the user, and (ii) a button that is depressible by at least one finger of the user within a predetermined movable range of the button, and the control program operating control the computer to carry out actions, comprising:
causing the device to present a sense of force against depressing of said button within a range;
receiving an input initiated by the user of a sense-of-force presentation start position in said predetermined movable range, and to store the sense-of-force presentation start position in a memory in response to the input initiated by the user;
acquiring a depress amount of said button;
receiving the sense-of-force presentation start position from the memory; and
instructing the presentation of the sense of force against depressing of said button when said depress amount reaches said sense-of-force presentation start position.

* * * * *